(12) United States Patent
Singman et al.

(10) Patent No.: US 10,165,122 B2
(45) Date of Patent: Dec. 25, 2018

(54) CENTRALLY PROVIDED INTERACTIVE CALL MENU FOR A CALL STRUCTURE

(71) Applicant: Genband US LLC, Plano, TX (US)

(72) Inventors: Jeffrey Singman, Manalapan, NJ (US); Dany Sylvain, Qatineau (CA)

(73) Assignee: GENBAND US LLC, Frisco, TX (US)

( * ) Notice: Subject to any disclaimer, the term of this patent is extended or adjusted under 35 U.S.C. 154(b) by 0 days.

(21) Appl. No.: 15/581,287

(22) Filed: Apr. 28, 2017

(65) Prior Publication Data
US 2018/0316792 A1   Nov. 1, 2018

(51) Int. Cl.
| H04M 3/00 | (2006.01) |
| H04M 5/00 | (2006.01) |
| H04M 3/51 | (2006.01) |
| H04L 29/06 | (2006.01) |
| H04L 29/08 | (2006.01) |
| H04M 7/12 | (2006.01) |
| H04M 7/00 | (2006.01) |

(52) U.S. Cl.
CPC ........ H04M 3/5191 (2013.01); H04L 65/608 (2013.01); H04L 67/02 (2013.01); H04L 67/20 (2013.01); H04M 7/003 (2013.01); H04M 7/1295 (2013.01); H04M 2203/355 (2013.01)

(58) Field of Classification Search
CPC .. H04M 3/5191; H04M 7/003; H04M 7/1295; H04M 2203/355; H04L 65/608; H04L 67/02; H04L 67/20

USPC ....................................... 379/265.09, 201.01
See application file for complete search history.

(56) References Cited

U.S. PATENT DOCUMENTS

| 2008/0144803 | A1* | 6/2008 | Jaiswal | ............... | H04M 3/5233 379/265.12 |
| 2014/0079207 | A1* | 3/2014 | Zhakov | ............... | H04M 3/5175 379/265.03 |

OTHER PUBLICATIONS

International Search Report and Written Opinion—PCT/US2018/029933—ISA/EPO—dated Jun. 26, 2018.

* cited by examiner

*Primary Examiner* — Quynh Nguyen
(74) *Attorney, Agent, or Firm* — Haynes and Boone, LLP

(57) ABSTRACT

According to one example, a method includes providing an interactive call menu creation service to a client device. The method further includes receiving a first dataset from the client device of an entity via the interactive call menu creation service, the first dataset including a call structure that defines a plurality of communication destinations and destination addresses for the communication destinations. The method further includes, in response to receiving the first dataset, generating a second dataset, the second dataset comprising code for embedding in a webpage to provide an interactive call menu for establishing communication to the plurality of communication destinations. The method further includes sending the second dataset to the client device in response to receiving the first dataset.

20 Claims, 9 Drawing Sheets

CENTRALLY PROVIDED INTERACTIVE CALL MENU FOR A CALL STRUCTURE

BACKGROUND

Various organizations such as commercial businesses, non-profit entities, or government agencies often have multiple divisions or departments that are separately contactable. For example, a business may have a sales department, a service department, and a scheduling department. When a user calls the organization, he or she may be presented with a call tree that allows the user to select the department that he or she wishes to contact using his or her telephone keys. In some cases, there are additional options to be selected after selecting the first option to get in contact with the person or department the user intends to contact.

As communication technology evolves, users may use methods for communication other than traditional phone technology. One such method includes WebRTC (Web Real Time Communication). WebRTC is a project by the World Wide Web Consortium (3C) to define a set of Application Programming Interfaces (APIs) to enable browser-to-browser and browser-to-device applications for voice, video, and text. The introduction of WebRTC as a solution allows for the creation of new usage models for communication services. One new usage model includes the ability of a web user to simply initiate a real-time communication via a web application on the user's device (e.g., a personal computer, mobile device, etc.). In this model, the user can access an identifier (e.g., uniform resource identifier (URI)) pointing to a specific carrier communication ID (e.g., phone number, SIP user ID) through the web application to initiate the WebRTC communication session.

In one example, a user utilizes a web application (e.g., browser) to visit a merchant's e-commerce website and contemplates making a purchase. There may be a link on a webpage of the merchant's e-commerce website that indicates that the user can initiate a communication session with a merchant's representative in real time to ask questions or to place an order. When the user selects the link through the web application, a separate WebRTC client on the user's device may be invoked to allow the user and the merchant's representative to conduct the communication session (e.g., voice, video, and text). It would be desirable for organizations that provide such services to streamline the process of connecting the user to the proper persons within the organization.

BRIEF DESCRIPTION OF THE DRAWINGS

The present disclosure is best understood from the following detailed description when read with the accompanying figures.

SUMMARY

Figure 1:
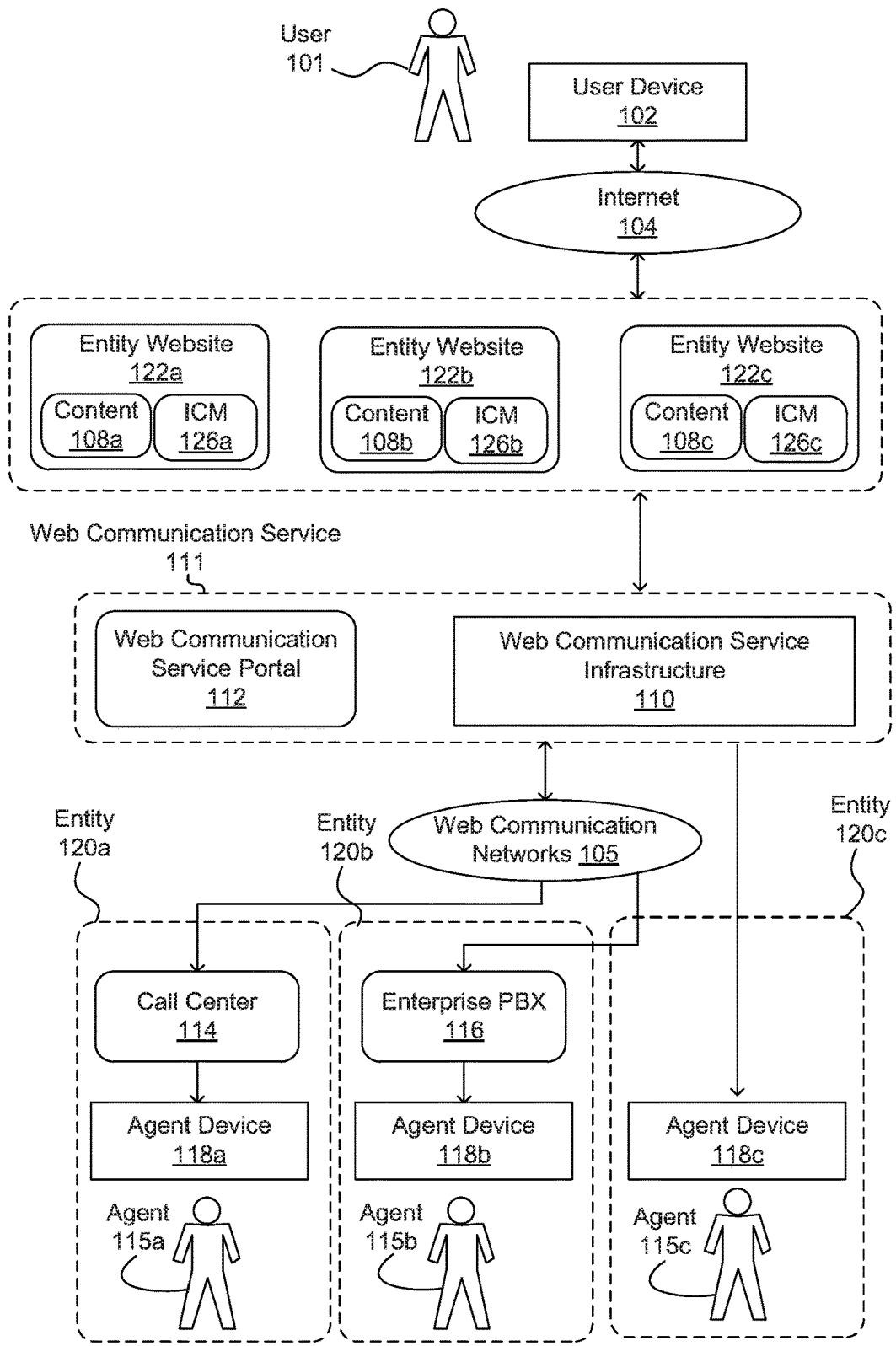
FIG. 1 illustrates an example of a communication service that may be used to centrally provide an interactive call menu for a call structure, according to one example of principles described herein.

According to one example, a method includes providing an interactive call menu creation service to a client device. The method further includes receiving a first dataset from the client device of an entity via the interactive call menu creation service, the first dataset including a call structure that defines a plurality of communication destinations and destination addresses for the communication destinations. The method further includes, in response to receiving the first dataset, generating a second dataset, the second dataset comprising code for embedding in a webpage to provide an interactive call menu for establishing communication to the plurality of communication destinations. The method further includes sending the second dataset to the client device in response to receiving the first dataset.

A method includes, with a web service portal, receiving from a first user device a first request for data associated with a first interactive call menu, the first interactive call menu having been defined by a first entity through a service provided by the web service portal. The method further includes, with the web service portal, in response to the request, providing at least a portion of data configured to present the interactive call menu on the first user device, the first interactive call menu being for contacting a plurality of communication destinations associated with the first entity using a web communication service. The method further includes, with the web service portal, receiving from a second user device a second request for data associated with a second interactive call menu, the second interactive call menu having been defined by a second entity through the service provided by the web service portal, the second entity being different than the first entity. The method further includes, with the web service portal, in response to the second request, providing at least a portion of data configured to present the second interactive call menu on the second user device, the second interactive call menu being for contacting a plurality of communication destinations associated with the second entity using the web communication service.

A system includes a processor and a memory comprising machine readable instructions that when executed by the processor, cause the system to receive a first dataset from a client device. The first dataset may include a call structure that defines a plurality of communication destinations and relationships between the plurality of communication destinations. The system is further to create a second dataset. The second dataset includes code for embedding in a webpage to provide an interactive call menu for establishing communication to the plurality of communication destinations. The system is further to provide the code to the entity.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As discussed above, it would be desirable for organizations to streamline the process of connecting users to the proper persons within the organization. According to principles described herein, a web communication service, such as a WebRTC service, may offer a service that allows an organization to create a customized interactive call menu for a call structure. Such an interactive call menu may then be made available on the organization's website. The call structure may be, for example, a call tree that has a root node associated with the organization's main line, and child nodes associated with different departments. Alternatively, the call structure may be in list format, with the different departments and sub-departments organized in list form.

In one example, the WebRTC service, or other type of communication service, provides a web communication service portal. The web communication service portal offers an interactive call menu creation service that allows an entity (i.e., organization) to define an interactive call menu for a call structure. Specifically, the web communication service portal may receive from the entity, a first dataset from a computing device of the customer. The first dataset may include information that defines the call structure. For example, the first dataset may include the names of different nodes within a call tree, each node corresponding to a different communication destination (e.g., division or department within a business) and the destination addresses (e.g., phone numbers and/or extensions, network addresses, WebRTC destination addresses) of those communication destinations. The interactive call menu creation service may then take this information and create code for integration into a webpage of the entity's website. That code is then used to provide the interactive call menu defined by the entity. In some examples, the code that is embedded in the entity's webpage may include only a part of the information required to present the interactive call menu to a user. The code may reference a location managed by the web communication service to retrieve more information used to present the interactive call menu to the user. The web communication service may store data for several different interactive call menus, each interactive call menu being customized for a different entity.

When a user accesses the entity's website, he or she may be provided with the interactive call menu. The interactive call menu may be a graphical user interface that includes the various communication destinations. The user may then select one of the listed communication destinations from the interactive call menu. The user's selection may then be sent to the web communication service in order to establish a communication session (voice, video, text) between the user and the communication destination selected by the user.

Through use of principles described herein, an organization is able to simply and efficiently provide an interactive call menu to users of its website. The end user thus does not have to dial a number, listen to the options, press a number on his or her phone, listen to additional options, and press additional numbers, until he or she finally reaches the desired department or individual. Instead, the user may simply work through the interactive call menu to select the desired department or division within the entity and be connected. Moreover, the entity does not have to create this interactive call menu. Instead, the web communication service creates this interactive call menu for the entity based on the parameters provided to the web communication service. Further, the entity does not have to expend resources maintaining the interactive call menu, as it may be maintained at least in part by the web communication service.

FIG. 1 illustrates a web communication service 111 that may be used to centrally provide an interactive call menu 126 for a call structure. According to the present example, a user 101 may interact with a user device 102 to access an entity's website 122a. The entity's website 122a may include an interactive call menu 126a that uses the web communication service 111 to connect the user device 102 to an agent device 118a of the entity 120a.

While only a single user 101 and user device 102 is shown, several other users (not shown) may use computing devices to access the entity's website 122a and use the interactive call menu 126a. Additionally, the user 101, and other users, may access websites 122b, 122c associated with other entities 120b, 120c that have interactive call menus 126b, 126c. The web communication service 111 may manage each of the different interactive call menus 126a, 126b, 126c for the various entities 120a, 120b, 120c.

An entity, such as entity 120a may be an organization such as a business, non-profit organization, or government agency. In the present example, the first entity 120a includes a call center 114 that is enabled for communication with the web communication service (i.e., WebRTC service). The second entity 120b may be associated with a conventional telephony Private Branch eXchange (PBX). In such case, the web communication service may interface with the PBX to reach specific agents associated with the entity 120b. The third entity 120c may not have a call center or a PBX. Instead, the interactive call menu 126c for the third entity's website 122c may identify specific phone numbers to directly contact persons or departments within the entity. The agents 115a, 115b, 115c (e.g., customer service representatives) may use agent devices 118a, 118b, 118c (e.g., desktop computers or mobile phones) to communicate with users such as user 101 who wish to contact a particular entity.

The call center 114 may include a plurality of agents 115a, such as customer service representatives or other employees. Such agents 115a may use agent devices 118a. The agent devices 118a may be physical computing systems or other types of communication equipment capable of using the web communication service 111 to communicate with users, such as user 101. In some examples, the call center 114 may be owned and managed entirely by the entity 120a. In some examples, the call center 114 may be associated with a third party organization that sells its call center services to organizations such as entity 120a. In other words, the call center 114 may have agents that answer calls on behalf of multiple organizations in addition to entity 120a.

The PBX 116 may be a traditional telephony PBX or an Internet Protocol (IP) PBX. The PBX may facilitate communication among persons associated with the entity 120b as well as between persons within the entity 120b and without. The web communication service 111 may connect with the PBX 116 in some cases to connect the user to the desired person within the organization.

The entities 120a, 120b, 120c may each host their own websites 122a, 122b, 122c. In some examples, the websites 122a, 122b, 122c may be enterprise web portals. Each of the websites 122a, 122b, 122c may be associated with one or more servers (not shown). That is, the entities 120a, 120b, 120c may own, operate, manage, or lease such servers. An example of a server that may be used in various embodiments includes a commodity server, running Linux or other appropriate operating system. Various embodiments may use any appropriate server. Such servers may thus store content 108a, 108b, 108c that is provided to a user device 102 and rendered for display to the user 101. In other words, data representing the content 108a, 108b, 108c is transmitted over a network such as the Internet 104 from the server to the user device 102. The user device 102 may then use a web content rendering application such as a browser to present the website 122a, 122b, 122c to the user 101.

In one example, the website 122a includes an interactive call menu 126a that allows the user to select a communication destination associated with the entity 120a. A communication destination may be a department or division within the entity. A communication destination may also be an individual person within the entity 120a. Upon selecting a department or individual person, the web communication service 111 connects the user 101 to the selected communication destination of the entity 120a. The user 101 may be connected in a variety of ways. In one example, the user is connected via a real time web communication service such as WebRTC. The user 101 may thus use the same device (e.g., laptop computer) that is accessing the website 122a to communicate with the entity 120a. More specifically, the user may use the same web browser (or other web content rendering application) that accesses the website 122a to communicate with the agent 115a. The communication session may include a variety of modalities, including voice, video, and chat communication.

The web communication service 111 includes a web communication infrastructure 110. The web communication infrastructure 110 includes the hardware, software, and other types of equipment to provide a web communication service 111. For example, the web communication infrastructure may include a variety of physical and virtual servers, some of which are controlled by the web communication service and some of which may be leased from other entities. The web communication infrastructure 110 may include, or work with, web communication networks 105.

The web communication infrastructure 110 includes a web communication service portal 112. The web communication service portal 112 in this example includes a user interface tool through which a customer, such as the entity 120a, interacts with the web communication service 111 to create the interactive call menu 126a. For example, the web communication service portal 112 may allow a representative from the entity 120a to provide the web communication service 111 with various parameters for the interactive call menu 126a, such as the type of call structure and the destination addresses for each of the communication destinations within the call structure. The web communication service 111 may then provide the entity 120a with a piece of code designed for integration into the entity's 120a website 122a. Thus, the entity 120a in this example does not create the code but instead may rely on the web communication service 111. The entity 120a may also rely on the web communication service to manage the resources associated with providing the interactive call menu 126a. In this way, the interactive call menu 126a, along with the interactive call menus 126b, 126c for other entities 120b, 120c are centrally managed.

Figure 2:
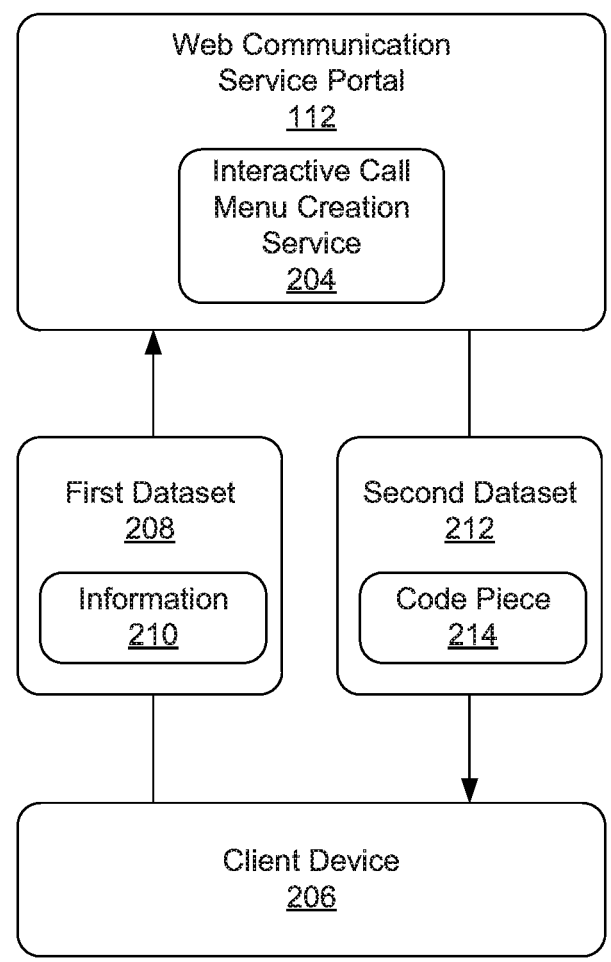
FIG. 2 is a diagram showing communication between a web communication service portal and a client device to create the interactive call menu for the call structure, according to one example of principles described herein.

FIG. 2 is a diagram showing communication between a web communication service portal 112 and a client device 206 to create the interactive call menu for the call structure. As described above, the web communication service portal 112 may be provided with resources of the web communication service infrastructure 110. The client device 206 may be a computing device associated with the entity 120. For example, the client device 206 may be associated with an Information Technology (IT) employee of the agency who is tasked with setting up the entity's website 122. In one example, client device 206 may include a smart phone, tablet computer, laptop or desktop computer, workstation, or server computer as appropriate.

In one example, the IT employee may access the interactive call menu creation service 204 through the web communication service portal 112. The interactive call menu creation service 204 may include the hardware, software, or combination of both to provide customers with the ability to create an interactive call menu feature. The interactive call menu creation service 204 may provide a user interface to customers through, for example, a website. The user interface may provide the customer with the tools to create a customized interactive call menu that connects users with the desired persons associated with the entity. An example user interface for the interactive call menu creation service 204 will be described in further detail below.

According to the present example, a first dataset 208 is sent from the client device 206 and is received by the web communication service portal 112. The first dataset 208 includes any data that is sent together or separately to the web communication service portal 112 for use by the interactive call menu creation service 204. The first dataset 208 includes information 210 that is used to customize the web communication feature.

Such information 210 may include one or more call structures. A call structure defines a plurality of communication destinations and relationships between those destinations. For example, the call structure may have a root node associated with the main phone number of the entity. Child nodes of that root node may be associated with different departments within the entity, each having their own destination address (e.g., phone number). Some of the child nodes may have child nodes, representing sub-departments or specific individuals within a department. The destination addresses may be, for example, a phone number for such individuals or departments. In examples that involve communication to Internet Protocol (IP) destinations, the destination addresses may be IP addresses.

With the information 210 received in the first dataset 208, the interactive call menu creation service 204 may create a piece of code 214, alternatively referred to as a code piece 214. In one example, creating the code 214 may include parsing the information 210 to determine any hierarchical relationships or other relationships between the various call destinations. Creating may then further include generating HTML, XML, Java, or other computer code to appropriately represent data identifying the call destinations as well as the hierarchical or other relationships between the various call destinations. The code piece 214 may then be sent in a second dataset 212 from the web communication service portal 112 to the client device 206. The entity 120 may then use that code piece 214 for integration with its website 122.

The code piece 214 may include machine readable instructions that when executed, cause the system executing the code to instruct the web communication service to establish a communication session between the system executing the code and a communication destination specified in the code. In some examples, the code may include a Universal Resource Locator (URL) to resources associated with the web communication service (e.g., 111, FIG. 1). In some examples, the code piece 214 may include proprietary data from the web communication service 111. The code piece 214 may include the logic to present the interactive call menu to the user and to establish communication sessions to various communication destinations based on user input. The code piece 214 may also be configured for a particular software platform as defined by the entity.

Figure 3:
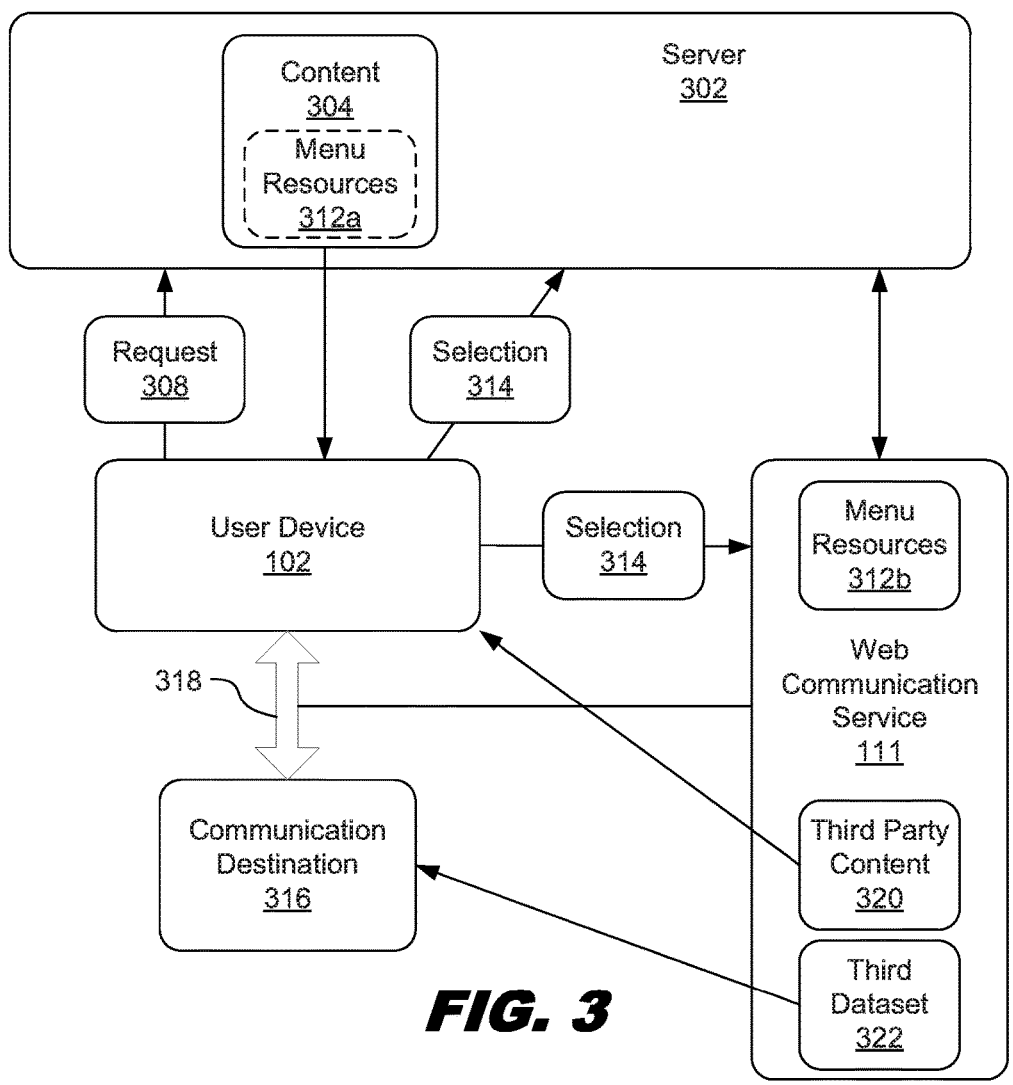
FIG. 3 is a diagram showing use of the interactive call menu for a call structure, according to one example of principles described herein.

FIG. 3 is a diagram showing use of the interactive call menu for a call structure. According to the present example, the user may access a website 122a associated with the entity 120a. When doing so, the user's device 102 sends a request 308 to the entity's server 302 for data. The server 302 responds by sending the content 304 that is used by the user device 102 to render a webpage of the entity's website 122. Such data may include, for example, HTML code, XML code, java applets, and other information used by a web browser of the user device 102.

As described above, the entity's website 122a includes an interactive call menu 126a that allows the user 101 to navigate a call structure to directly contact a specific department or individual within an organization. In order to display such an interactive call menu to the user, the user's device 102 may obtain resources 312a from the entity's server as well as resources 312b from a server associated with the web communication service. In other words, some of the data used to present the interactive call menu to the user may be stored within the web communication service infrastructure (e.g., 110, FIG. 1).

With the interactive call menu 126a presented to the user 101, the user 101 may navigate the call structure and make a selection. The call structure may be presented to the user in a variety of means. In one example, the call structure may be presented graphically, with each node labeled with the department or individual associated with that node. In some examples, the call structure may be presented in a list. If the user interacts with a particular entry in the list, any sub-entries that may be underneath the selected entry may be presented. For example, if the user selects a sales department for a retailer, the user may be presented with different categories of items for sale. Each category of item for sale may be associated with a different destination address (e.g., phone number). The user may also specify the type of communication he or she wishes to use. For example, the user may wish to only use chat. Additionally or alternatively, the user may wish to use voice or video. The user's selection will be sent back to the server 302 and/or the web communication service 111. If the user's selection 314 is sent to the server 302, the server may then forward those selections to the web communication service 111.

Upon receiving the user's selections 314, the web communication service 111 may establish a communication session 318 between the user device 102 and the selected communication destination 316. As described above, the communication destination may be a department or individual associated with the entity 120a. In some examples, the communication session 318 is a web communication session such as a WebRTC session. Such a session uses real time communications between web applications (e.g., web browsers or other applications that can render web content). In some examples, the communication session may involve traditional telephony communication technology. For example, the web communication service 111 may interact with a conventional telephony system to connect the user device 102 (using voice communication) to a telephone number. The web communication service 111 may also navigate the entity's call structure by injecting Dual Tone Multi-Frequency (DTMF) signals into the communication session.

In some examples, the web communication service may send data representing third party content 320 to the user device 102 in response to providing resources 312b for the interactive call menu 126a. For example, a third party may wish to sell its products or services to users of the interactive call menu. Thus, the web communication service may present content from such third parties within the interactive call menu 126a.

In some examples, the web communication service may send a third dataset 322 to the communication destination. The third dataset 322 may include information obtained from the user through the interactive call menu feature. For example, the interactive call menu may allow the user to enter his or her name, email address, phone number, or other types of information the user may be willing to share. The user may also provide specific information about which he or she would like to speak with the entity 120a.

Figure 4:
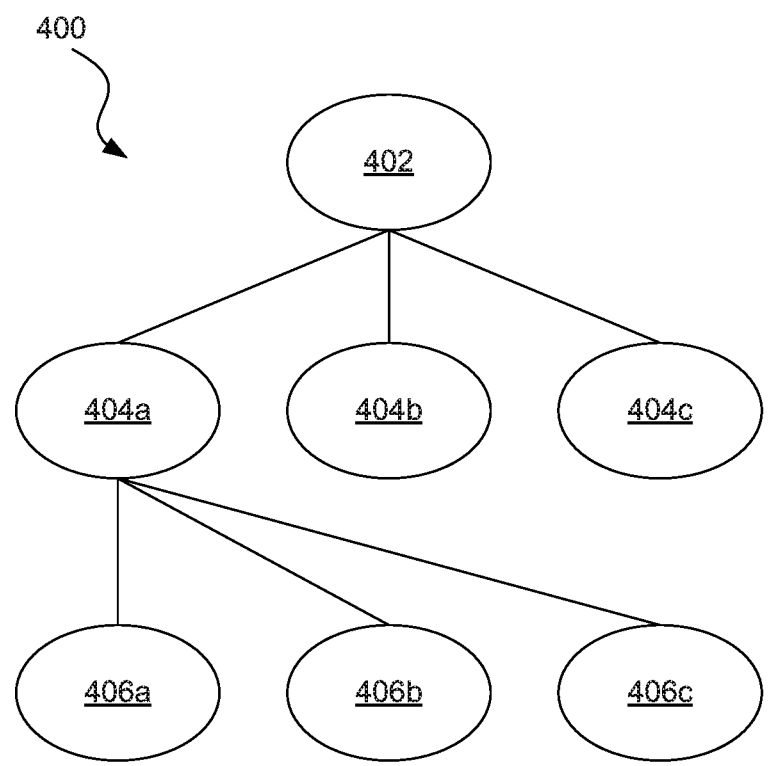
FIG. 4 is a diagram showing an illustrative call structure, according to one example of principles described herein.

FIG. 4 is a diagram showing an illustrative call structure 400. According to the present example, the call structure 400 has a root node 402. The root node 402 includes three child nodes 404a, 404b, 404c. Child node 404a has three child nodes 406a, 406b, 406c. Each node may be associated with a different communication destination.

In one example, the entity 120 is an auto dealer. In such case, the root node 402 may be associated with the auto dealer's main number. To further the example, child node 404a may be associated with sales, child node 404b may be associated with service, and child node 404c may be associated with parts. Each of the child nodes 406a, 406b, 406c of child node 404a may be associated with different types of vehicles. If a user were to dial the entity's main phone number without using features described herein, he or she would have to listen to the options and make a selection (e.g., "press 1 for sales"). The user would then have to listen to the next menu level to make a selection for vehicle type. Some entities have several levels through which a user must navigate to reach the desired department or entity. However, using principles described herein, the user can simply select a desired communication destination. For example, the user may select the communication destination associated with node 406b in the interactive call menu. Thus, the user does not have to listen to any automated recording that instructs the user to enter specific numbers for specific departments.

Figure 5:
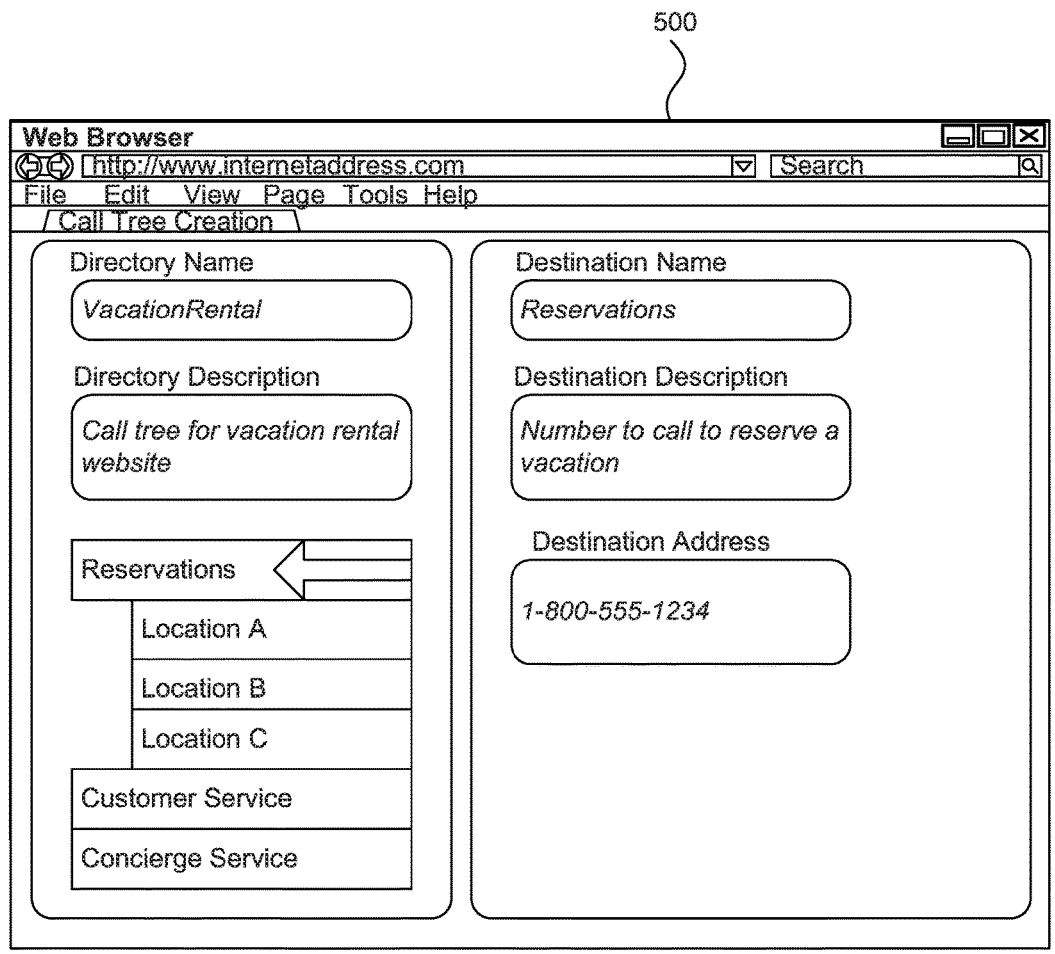
FIG. 5 is a diagram showing an illustrative user interface to create the interactive call menu, according to one example of principles described herein.

FIG. 5 is a diagram showing an illustrative user interface 500 to create the interactive call menu. As described above, a web communication service may offer a web communication service portal. Through that portal, a customer, such as the entity 120a, may define the parameters of a call structure. In the present example, the entity 120a is a vacation rental management company. Through the user interface 500, the user defines a directory name. The entity 120a may also provide a directory description. In this example, the vacation rental may have five three different departments; reservations, customer service, and concierge service. Each of these departments may have a different destination address. In addition, some departments may have sub-departments. For example, the reservations department has a sub-department for location A, a sub-department for location B, and a sub-department for location C. Each one of the sub-departments may also have its own destination address (e.g., phone number or WebRTC destination).

In the present example, the user (i.e., entity) has selected the Reservations communication destination. Thus, the user can enter additional information for that communication destination such as the destinations name ("Reservations"), the destination description ("Number to call to reserve a vacation"), and the destination address ("1-800-555-1234"). The user interface 500 is merely one example of a user interface that can be used to allow an entity to create an interactive call menu for a call structure.

Figure 6:
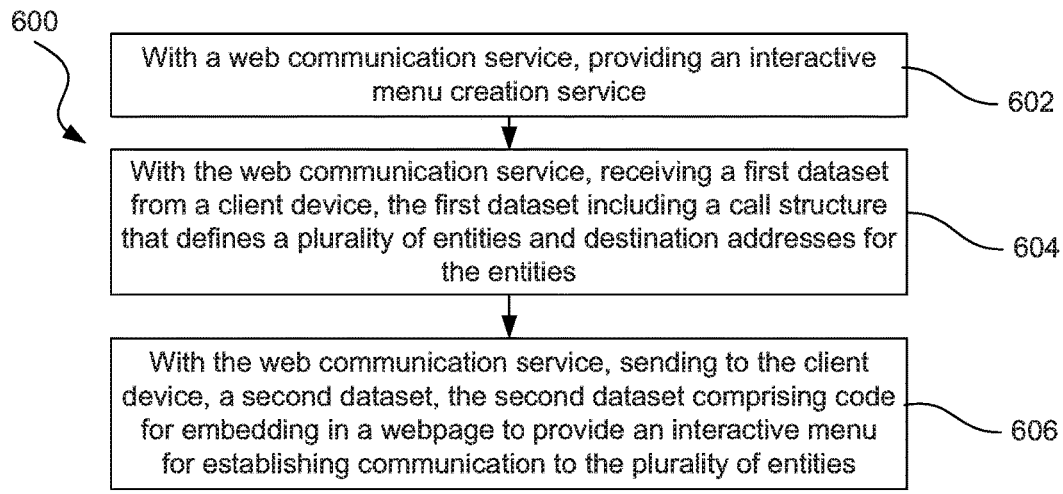
FIG. 6 is a flowchart showing an illustrative method for creating the interactive call menu for a call structure, according to one example of principles described herein.

FIG. 6 is a flowchart showing an illustrative method 600 for creating the interactive call menu for a call structure. According to the present example, the method 600 includes a process 602 for, with a web communication service portal, providing an interactive call menu creation service. For example, a customer may be presented with a user interface such as the one described above in the text accompanying FIG. 5. As described above, the interactive call menu creation service allows an entity, such as a business or other type of organization, to create an interactive call menu that specifies multiple communication destinations within the organization to which a user may connect.

The method 600 further includes a process 604 for, with the web communication service portal, receiving a first dataset from a client device, the first dataset including a call structure that defines a plurality of entities and destination addresses for the entities. The call structure may be in a variety of formats. For example, the call structure may be a call tree that includes a root node associated with the entity's main phone number and child nodes associated with different departments within the organization. In some examples, the call structure may include multiple call trees, each call tree associated with a different department. In some examples, the call structure may be a list of communication destinations within the entity. The web communication service takes the data received from entity to generate a code piece for rendering the interactive call menu. Generating the code piece may include parsing the information received from the entity to determine any hierarchical relationships or other relationships between the various call destinations. Generating the code piece may then further include generating HTML, XML, Java, or other computer code to appropriately represent data identifying the call destinations as well as the hierarchical or other relationships between the various call destinations.

The method 600 further includes a process 606 for, with the web communication service portal, sending to the client device, a second dataset, the second dataset comprising code for embedding in a website to provide an interactive call menu for establishing communication to the plurality of entities. The code may be formatted in a variety of formats such as HTML, XML, or a java applet. The code includes machine readable instructions that when executed by a processor cause a user user's device to access resources of the web communication service and establish a communication session between the user's device and communication destinations specified by the entity. For example, a WebRTC communication session may be established through the user's browser and a browser of an agent associated with the entity. In some examples, the communication session may be a voice communication that is established between the user's web browser and a telephone number associated with the entity. In such case, the web communication service may inject DTMF signals into the communication session to navigate the entity's call tree on the entity's main line to reach the destination selected by the user.

Figure 7:
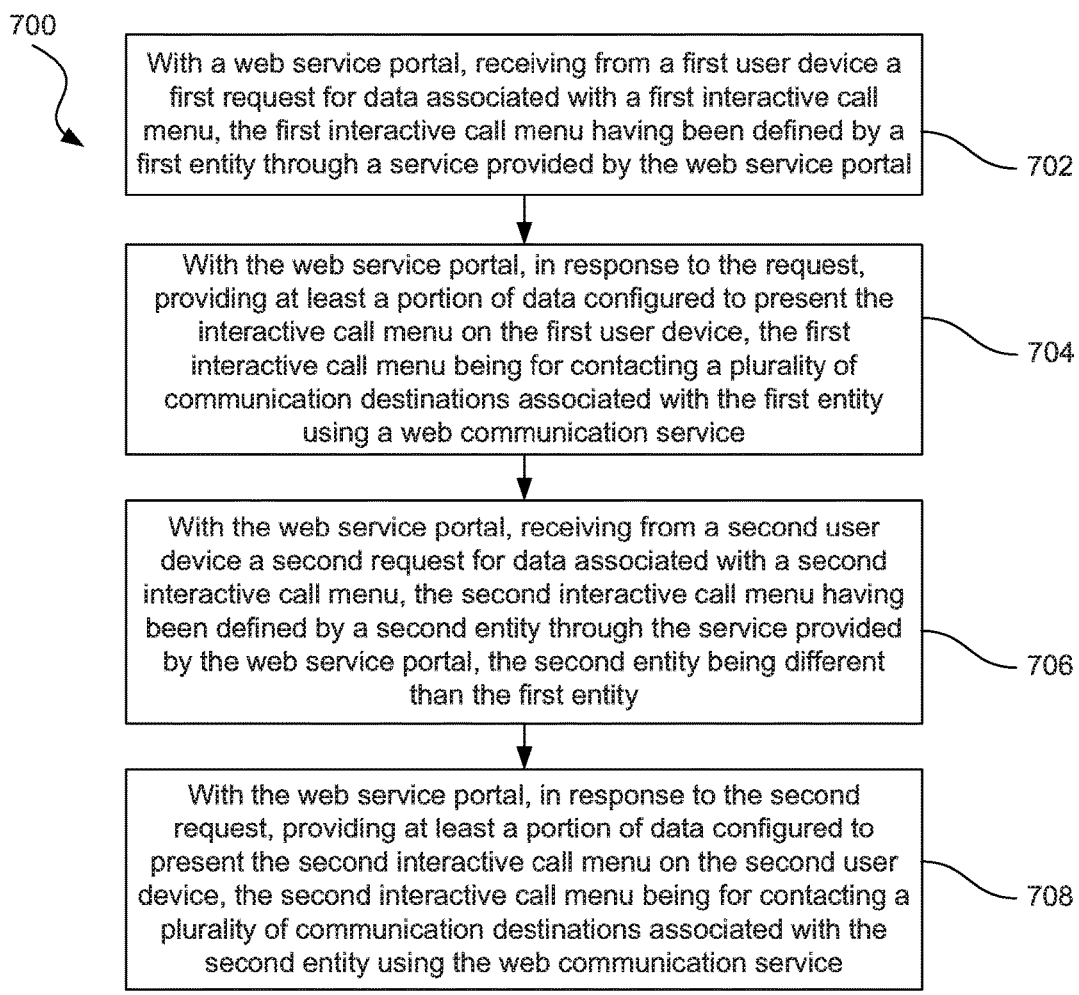
FIG. 7 is a flowchart showing an illustrative method for using the interactive call menu for a call structure, according to one example of principles described herein.

FIG. 7 is a flowchart showing an illustrative method 700 for using the interactive call menu for a call structure. According to the present example, the method 700 includes a process 702 for, with a web service portal, receiving from a first user device (e.g., 102) a first request for data associated with a first interactive call menu (e.g., 126a). The first interactive call menu having been defined by a first entity (e.g., 120a) through a service provided by the web service portal. The first request may be sent in response to a user interacting with a website associated with the first entity. The website may have code embedded therein that was provided by the web service portal. The code may identify the proper interactive menu for the entity.

The method 700 further includes a process 704 for, with the web service portal, in response to the request, providing at least a portion of data configured to present the interactive call menu on the first user device. The first interactive call menu is for contacting a plurality of communication destinations (e.g., departments within an entity) associated with the first entity using a web communication service (e.g., WebRTC).

The method 700 further includes a process 706 for, with the web service portal, receiving from a second user device a second request for data associated with a second interactive call menu. The second interactive call menu (126b) having been defined by a second entity (e.g., 120b) through the service provided by the web service portal. The second entity is different than the first entity.

The method 700 further includes a process 704 for, with the web service portal, in response to the second request, providing at least a portion of data configured to present the second interactive call menu 126b on the second user device. The second interactive call menu is for contacting a plurality of communication destinations associated with the second entity using the web communication service.

Through interaction with either the first interactive menu, or the second interactive menu, a user may establish a communication session between his or her device and an agent of the entity associated with the interactive call menu. Specifically, the web communication service may connect to a destination address associated with the selection made by the user through the interactive call menu. In some examples, the destination address is an IP address, MAC address, and/or another type of logical/physical network address. The communication session may be a WebRTC communication session. In some examples, however, the communication session may involve traditional telephone communication services in addition to the web communication service. In other words, the web communication service may interface with a telephone service to complete the connection between the user device and the entity's agent.

In some examples, the destination address may be obfuscated from the user. In other words, the user may not actually be provided with the destination address. Thus, the user must use the interactive call menu to contact the entity in such a manner. This may be accomplished in one of a variety of ways. In one example, the destination address may be encrypted. In such case, the web communication service may maintain the key for decrypting the encrypted destination address. Thus, the web communication service will decrypt the destination address before establishing the communication session. In some examples, the data that is sent to the user device to render the interactive call menu only includes pointers for the communication destinations. Those pointers may reference memory locations accessible by the web communication service, and not necessarily the user device. Those pointers may then store the destination addresses of the communication destinations.

Figure 8:
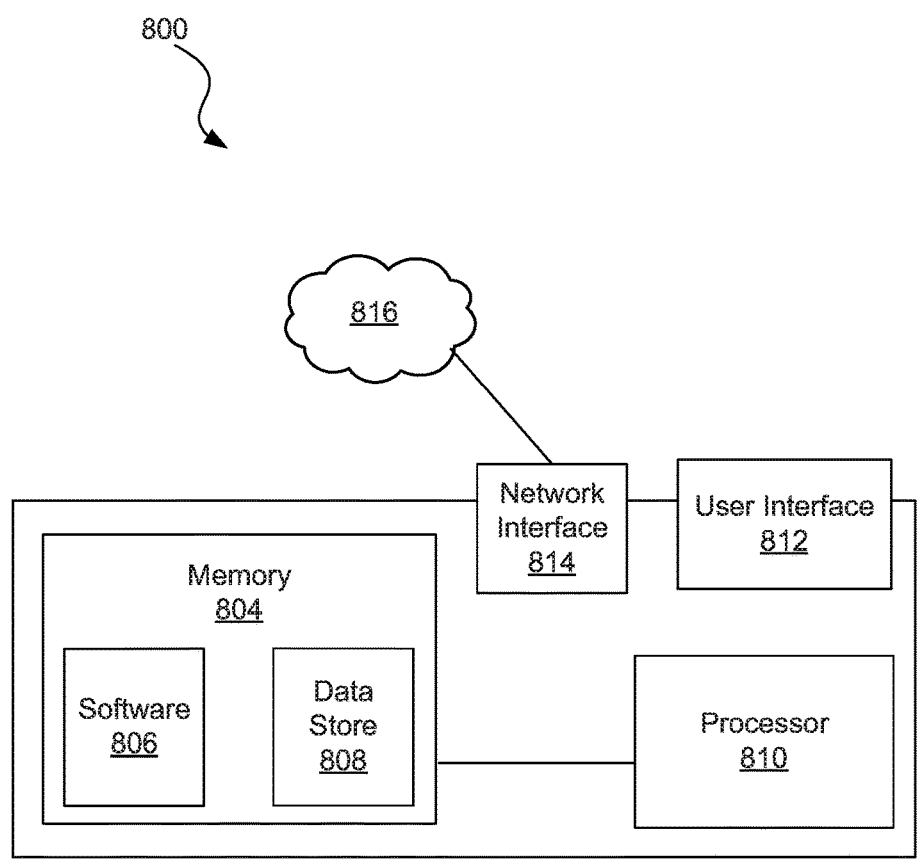
FIG. 8 is a diagram showing an illustrative computing system that may perform functions related to the interactive call menu for a call structure, according to one example of principles described herein.

FIG. 8 is a diagram showing an illustrative computing system 800 that may perform functions related to the interactive call menu (e.g., 312, FIG. 3) for a call structure. Such functions may include those described above in the text accompanying FIGS. 6-7. The computing system 800 may also be one of: a user device (e.g., 102, FIG. 1), an entity agent device (e.g., 118, FIG. 1), an entity server (e.g., 106, FIG. 1), or a server within the web communication service infrastructure (e.g., 110, FIG. 1). According to certain illustrative examples, the computing system 800 includes a memory 804 which may include software 806 and a data store 808. The processing system 800 also includes a processor 810, a network interface 814, and a user interface 812.

The memory 804 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 806 and data in the data store 808.

The computing system 800 also includes a processor 810 for executing the software 806 and using or updating the data 808 stored in memory 804. The software 806 may include an operating system and any other software applications a user may wish to install. In the case where the computing system 800 is associated with the web communication service infrastructure, the software 806 may be, for example, software designed to provide an interactive call menu creation service. In the case where the computing system 800 is a user device, the software 806 may be an application to render web content, such as a browser. The software 806 may include machine readable instructions of a computer program product that when executed, perform the functions described above in accordance with the text accompanying FIGS. 6-7.

The user interface 812 may include a number of input devices such as a mouse, touchpad, or touchscreen that allow the user to interact with the computing system 800. The user interface 812 may also include a number of different types of output devices such as a monitor or a touchscreen. The user interface allows the user to interact with the processing system 800 in a manner as described above.

The network interface 814 may include hardware and software that allows the processing system 800 to communicate with other processing systems over a network 816. The network interface 814 may be designed to communicate with the network 816 through hardwire media such as Ethernet, coaxial, fiber-optic, etc. The network interface 814 may also be designed to communicate with the network 816 using wireless technologies.

Figure 9:
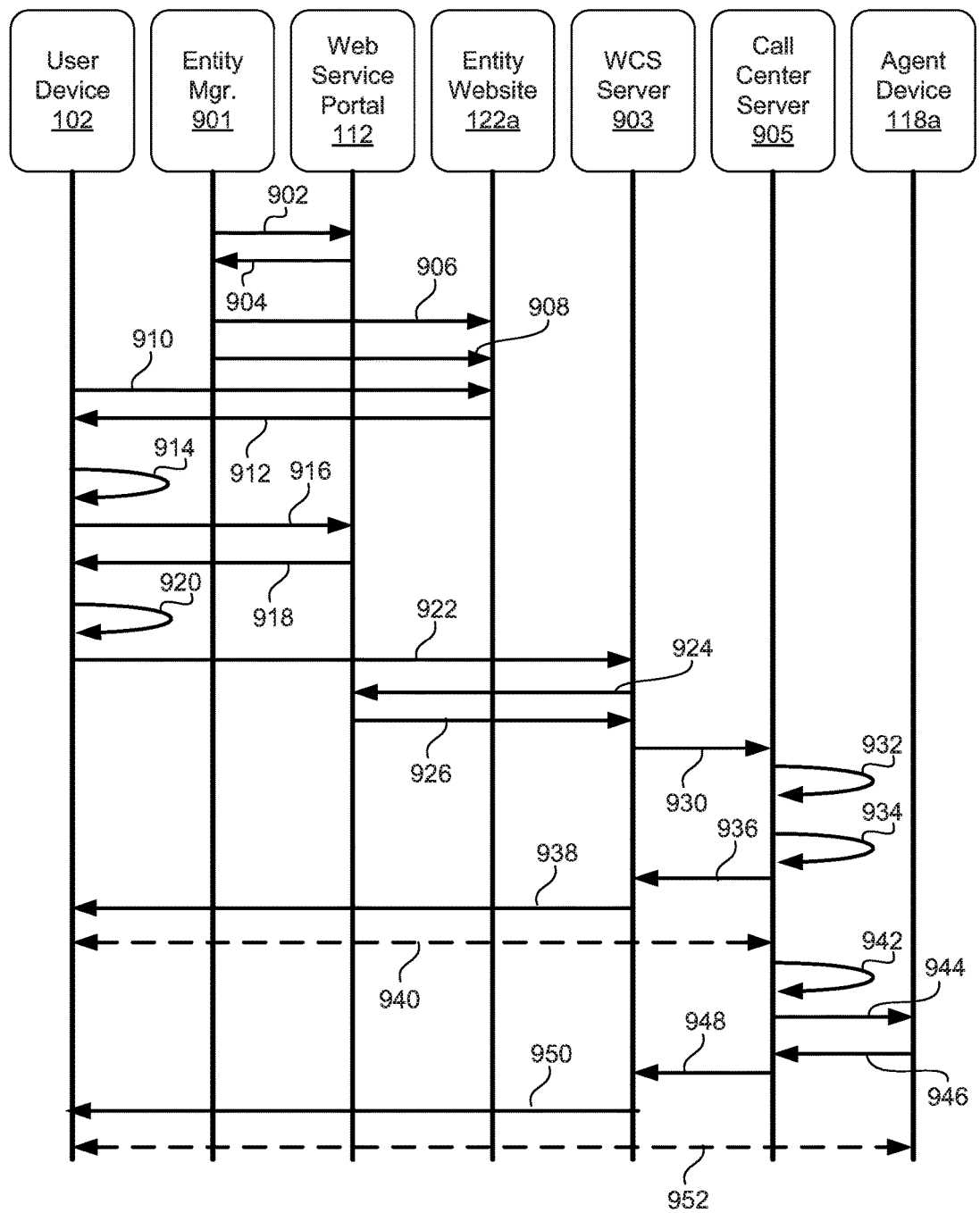
FIG. 9 is a signal diagram showing a communication session to a call center being established in response to user interaction with the interactive call menu, according to one example of principles described herein.

FIG. 9 is a signal diagram showing a communication session to a call center being established in response to user interaction with the interactive call menu. The signal diagram shows signals associated with a user device 102, and entity manager device 901, a web service portal 112, an entity website, a web communication service 903, a call center server 905, and an agent device 118.

The entity manager device 901 may be a computing device that is used by someone associated with an entity to create a website. For example, the device 901 may be used by an IT professional tasked with creating a website for an entity. The web communication service server may be one or more servers associated with the web communication service infrastructure 110.

The call center server 905 may be a server that is owned, operated, managed, or leased by an entity that has a call center. In the example where the web communication service is a WebRTC service, then the call center server 905 may be a WebRTC server. The call center server 905 may be configured to convert a WebRTC session to a Session Initiation Protocol (SIP) session to teach an existing enterprise call center (e.g., call center 114). This may include converting media from Opus/Real-time Transfer Protocol (RTP) to G.711/RTP for voice. Similar conversions may be done for video communication sessions.

Signal 902 represents data being sent to the web service portal to define an interactive menu. For example, signal 902 may correspond to the first dataset 208 described above. Signal 904 represents the code provided by the web communication service portal 112 for the customized interactive call menu. Signal 904 may correspond to the second dataset 212 described above.

Signal 906 represents data being sent to provide content (e.g., 108a) to an entity's website 122a, or more specifically, one or more servers that support the website 122a. Additionally, signal 908 represents the embedded code for the interactive call menu feature being uploaded to the website 122a.

At signal 910, a user interacts with the entity website 122a. For example, the user may type in the web address for the website in his or her browser. In response, signal 912 provides the content 108a to the user device as well as at least some of the data associated with the interactive call menu.

At signal 914, the user interacts with the interactive call menu. This causes the user device 102 to obtain additional data from the web service portal 112 at signal 916. At signal 918, the web service portal responds with additional data that is used to provide more details of the interactive call menu feature to the user.

The user may then navigate the interactive call menu to select a communication destination. The selected communication destination is then sent to the web communication service server 903 at signal 922. At signal 924, the web communication service server 903 may request contact details from the web communication service portal 112. Such contact details may be, for example, the destination address of the selected communication destination. The desired destination address is then provided to the web communication service server 903 at signal 926.

In one example, the selected destination address is that of a sales department within an entity's call center 114. At signal 930, the web communication service server 903 sends a Session Initiation Protocol (SIP) INVITE (Sales Department Number) to the call center server 905. At signal 932, the call is added to a sales department queue. At signal 934, a queue announcement is assigned. At signal 936, an answer message (e.g., 200 OK (answer)) is sent from the call center server 905 to the web communication service server 903. At signal 938, the web communication service starts the communication session with the user device 102. Afterwards, at signal 940, the user may hear the queue announcement that was assigned until an agent is available.

At signal 942, it is determined that a sales agent is available. The call center server 905 then sends a SIP INVITE message to the available agent at signal 944. At signal 946, the agent's device 118*a* responds with an answer message. The call server 905 then sends a SIP re-INVITE message with a new endpoint at signal 948. The web communication service server 903 then establishes a connection to the user device 102 at signal 950. Then, the communication session 952 between the user device 102 and the agent device 118*a* is established. As mentioned above, the communication session may include one of: voice, video, text, and other media types.

Figure 10:
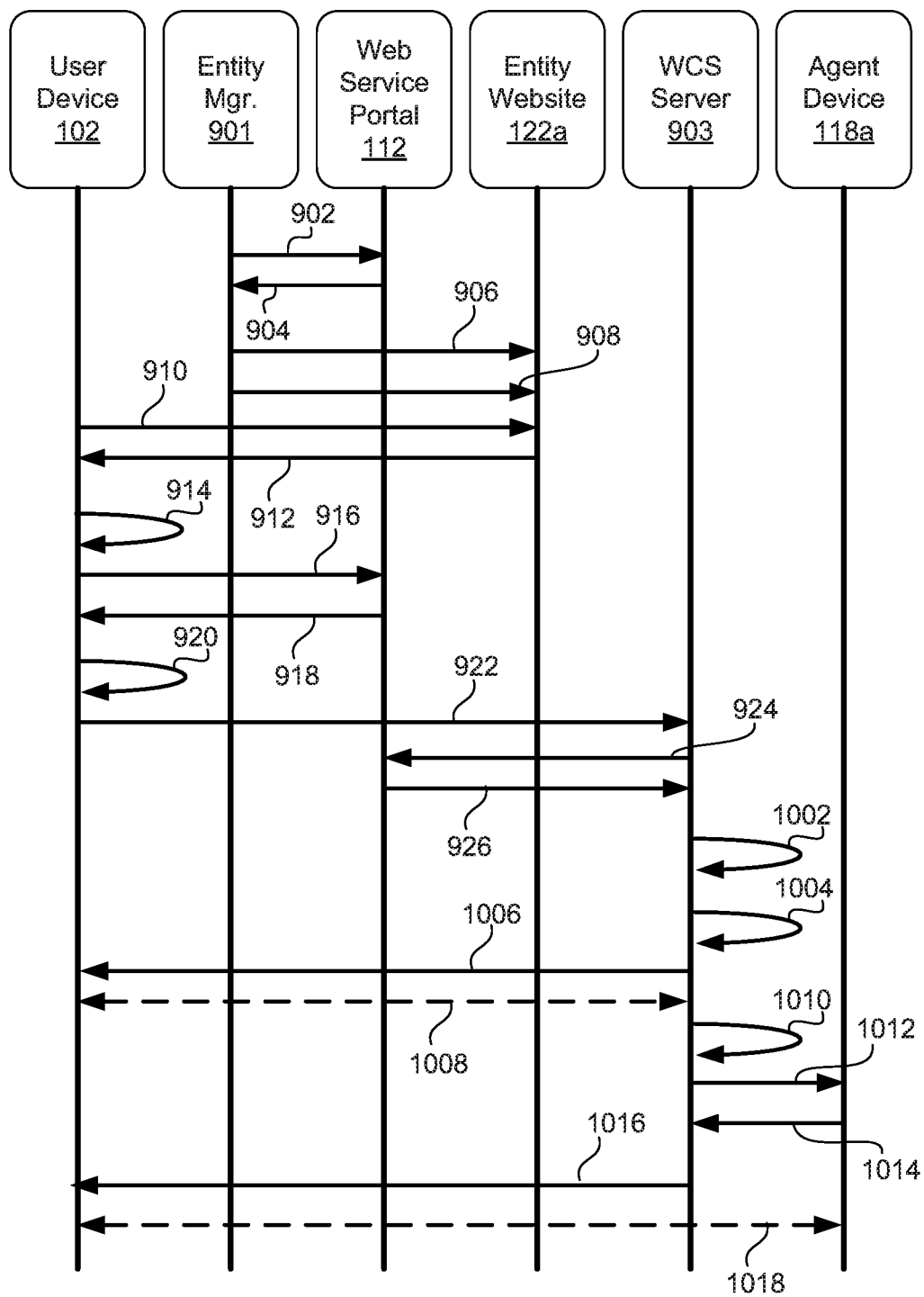
FIG. 10 is a signal diagram showing a communication session to an agent device being established in response to user interaction with the interactive call menu, according to one example of principles described herein.

FIG. 10 is a signal diagram showing a communication session to an agent device being established in response to user interaction with the interactive call menu. In the present example, instead of contacting a call center server, the web communication service server 903 contacts a department within the entity directly. Signals 902-926 are similar to those of FIG. 9 and will not be repeated. In this example, the web communication service server 903 may host the call center functionality so that the entity does not have to manage that aspect. The agents in this case may be using WebRTC enabled endpoints.

At signal 1002, after receiving the contact details for the user's selected destination (e.g., sales department), the call is added to the sales department queue. At signal 1004, a queue announcement is assigned. At signal 1006, the web communication service server 903 starts the communication session with the user device 102. Afterwards, at signal 1008, the user may hear the queue announcement that was assigned until an agent is available.

At signal 1010, it is determined that a sales agent is available. The web communication service server 903 then sends a session request to the available agent at signal 1012. At signal 1014, the agent's device 118*a* responds with an answer message. The web communication service server 903 then establishes a connection to the user device 102 at signal 1016. Then, the communication session 1018 between the user device 102 and the agent device 118*a* is established. As mentioned above, the communication session may include one of: voice, video, text, and other media types.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a web communication service, the method comprising:
    providing an interactive call menu creation service to a client device;
    receiving a first dataset from the client device of an entity via the interactive call menu creation service, the first dataset including a call structure that defines a plurality of communication destinations and destination addresses for the communication destinations, wherein at least one of the destination addresses comprises a Uniform Resource Identifier (URI);
    in response to receiving the first dataset, generating a second dataset, the second dataset comprising code for embedding in a webpage to provide an interactive call menu for establishing communication to the plurality of communication destinations; and
    sending the second dataset to the client device in response to receiving the first dataset.

2. The method of claim 1, wherein at least one of the destination addresses corresponds to a telephony destination.

3. The method of claim 2, further comprising, when establishing a communication session to one of the plurality of communication destinations, injecting Dual Tone Multi-Frequency (DTMF) signals to contact a selected one of the plurality of communication destinations.

4. The method of claim 1, wherein the destination addresses are associated with different departments of the entity.

5. The method of claim 1, further comprising, with a server associated with the entity, providing a website that uses the code to provide the interactive call menu.

6. The method of claim 5, further comprising, with the server, receiving through the interactive call menu, a request from a user device to establish a communication session to one of the destination addresses.

7. The method of claim 6, further comprising, with the server, establishing the communication session between the user device and the one of the destination addresses.

8. The method of claim 7, wherein the communication session includes at least one item selected from the list consisting of voice, video, and chat.

9. The method of claim 1, further comprising, with a server associated with the entity, sending a third dataset to one of the communication destinations, the third dataset including data obtained from the interactive call menu.

10. The method of claim 1, wherein destination addresses in the first dataset for the plurality of communication destinations are encrypted.

11. The method of claim 1, wherein the interactive call menu includes pointers to a memory location that stores destination addresses for the plurality of communication destinations.

12. The method of claim 1, further comprising, with the web communication service, sending data representing third party content to a user device in response to providing resources for the interactive call menu to the user device.

13. A method comprising:
    with a web service portal, receiving from a first user device a first request for data associated with a first interactive call menu, the first interactive call menu having been defined by a first entity through a service provided by the web service portal;
    with the web service portal, in response to the request, providing at least a portion of data configured to present the interactive call menu on the first user device, the first interactive call menu being for contacting a plurality of communication destinations associated with the first entity using a web communication service, wherein destination addresses for the communication destinations comprise Uniform Resource Identifiers (URIs);

with the web service portal, receiving from a second user device a second request for data associated with a second interactive call menu, the second interactive call menu having been defined by a second entity through the service provided by the web service portal, the second entity being different than the first entity;

with the web service portal, in response to the second request, providing at least a portion of data configured to present the second interactive call menu on the second user device, the second interactive call menu being for contacting a plurality of communication destinations associated with the second entity using the web communication service.

14. The method of claim 13, wherein the first interactive call menu provides the plurality of communication destinations in a call structure in a graphical user interface.

15. The method of claim 13, wherein the destination addresses of the communication destinations are obfuscated from the first user device.

16. A system comprising:
a processor; and
a memory comprising machine readable instructions that when executed by the processor, cause the system to:
receive a first dataset from a client device, the first dataset including a call structure that defines a plurality of communication destinations and relationships between the plurality of communication destinations;
create a second dataset, the second dataset comprising code for embedding in a webpage to provide an interactive call menu for establishing communication to the plurality of communication destinations, wherein destinations addresses for the communication destinations are Internet Protocol (IP) addresses; and
provide the code to an entity.

17. The system of claim 16, wherein the communication destinations are associated with different departments of the entity.

18. The system of claim 16, wherein the system is further to receive a third dataset from one of the communication destinations, the third dataset including data obtained from the interactive call menu.

19. The system of claim 16, wherein destination addresses in the first dataset for the plurality of communication destinations are encrypted.

20. The system of claim 16, wherein the interactive call menu includes pointers to a memory location that stores destination addresses for the plurality of communication destinations.

* * * * *